US012728661B2

(12) United States Patent
Drape

(10) Patent No.: US 12,728,661 B2
(45) Date of Patent: Sep. 8, 2026

(54) CELEBRATION KIT

(71) Applicant: Thomas Drape, Leawood, KS (US)

(72) Inventor: Thomas Drape, Leawood, KS (US)

( * ) Notice: Subject to any disclaimer, the term of this patent is extended or adjusted under 35 U.S.C. 154(b) by 294 days.

(21) Appl. No.: 18/659,668

(22) Filed: May 9, 2024

(65) Prior Publication Data

US 2024/0375422 A1 Nov. 14, 2024

Related U.S. Application Data

(60) Provisional application No. 63/501,509, filed on May 11, 2023.

(51) Int. Cl.

*B42D 15/04* (2006.01)
*B65B 5/08* (2006.01)
*A63H 27/10* (2006.01)
*A63H 37/00* (2006.01)

(52) U.S. Cl.

CPC .............. *B42D 15/042* (2013.01); *B65B 5/08* (2013.01); *A63H 27/10* (2013.01); *A63H 2027/1033* (2013.01); *A63H 2027/1041* (2013.01); *A63H 37/00* (2013.01)

(58) Field of Classification Search

CPC ........ B42D 15/042; B65B 5/08; A63H 27/10; A63H 37/00; A63H 2027/1033; A63H 2027/104

See application file for complete search history.

(56) References Cited

U.S. PATENT DOCUMENTS 5,586,659 A * 12/1996 Trumbo ............... B42D 15/042 206/751
5,822,897 A * 10/1998 Ertzan .................. B42D 15/042 40/748
5,890,744 A * 4/1999 Chan ...................... A63H 37/00 283/117
6,047,831 A * 4/2000 Jones ..................... B65D 81/02 206/466
6,460,193 B1 * 10/2002 Di Palma ................. A42C 5/00 2/209.13
9,622,423 B1 * 4/2017 Rexford ................... A01G 5/04
(Continued)

OTHER PUBLICATIONS

Metallic Blush Birthday Room Decorating Kit, https://www.partycity.com/metallic-blush-birthday-room-decorating-kit-912549.html, publication date unknown, Party City, USA.
(Continued)

*Primary Examiner* — Gary C Hoge
(74) *Attorney, Agent, or Firm* — AVEK IP, LLC; Kent R. Erickson

(57) ABSTRACT

A kit for creating a scene to celebrate an event includes a main element and a mat that defines an area of the scene. The mat may have a design graphic printed thereon that corresponds to a theme of the event. The mat is configured to support auxiliary elements thereon. The kit may include one or more auxiliary elements thematically associated with the event or scene including one or more note cards that corresponds to the event or theme and a banner that includes a message board for conveying a message displayed on a front surface of the message board and that is configured to extend over the scene. The kit includes a template that is a visual representation of where to position the auxiliary elements upon the mat.

20 Claims, 7 Drawing Sheets

(56) References Cited

U.S. PATENT DOCUMENTS

| | | | | |
|---|---|---|---|---|
| 10,150,046 | B1 * | 12/2018 | Lodal | A23P 20/25 |
| 2011/0094132 | A1 * | 4/2011 | DeFranco | B42D 15/045<br>40/124.17 |
| 2011/0206819 | A1 * | 8/2011 | Brysse | A21D 13/44<br>426/549 |
| 2013/0183884 | A1 * | 7/2013 | Catanzaro | A63H 33/26<br>446/485 |
| 2018/0370040 | A1 * | 12/2018 | Hong | B25J 11/003 |
| 2022/0039424 | A1 * | 2/2022 | Smith | G09F 3/00 |
| 2025/0344888 | A1 * | 11/2025 | Loya | A47G 33/00 |

OTHER PUBLICATIONS

Officially Retired Accessory Kit (6pc), https://www.partycity.com/officially-retired-accessory-kit-6pc-758216.html, publication date unknown, Party City, USA.

* cited by examiner

CELEBRATION KIT

CROSS-REFERENCE TO RELATED APPLICATION

This application claims the benefit of priority of U.S. Provisional Patent Application No. 63/501,509, entitled "Celebration Kit", and filed on May 11, 2023, the disclosure of which is herein incorporated by reference in its entirety.

BACKGROUND OF THE INVENTION

Field of the Invention

The present invention relates generally to a special occasion kit, and, more particularly, to a kit for assembling a scene on a table to celebrate an event with components thematically associated with the event.

Background

Greeting cards are given for special events, such as on birthdays, holidays, weddings, and graduations, to convey a message of celebration, to express a sentiment, such as condolences or to get well soon, and, sometimes, for no reason at all. A variety of greeting cards are available to consumers, including standard greeting cards that include a design on the front and a message on the inside, photo cards, cards with pre-recorded messages, and electronic cards that are delivered through an electronic mail service.

Alternatives are needed to provide ways to acknowledge special events and provide a unique experience, yet maintain the ease associated with sending greeting cards. The alternative should provide a celebration and encourage personal connections for sharing special events and memories.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

The embodiments described herein relate to a kit assemblable for creating a miniaturized scene to celebrate an event having a theme and that is configured to be contained on an individual's tabletop space. The kit is packaged in a casing prior to assembling and the casing is configured for shipping and handling of the kit. The kit includes a mat that defines an area of the scene and may include a graphic that thematically corresponds to the event. The mat is configured to support components thereon that are thematically associated with the scene or event, including a main element or one or more cards, such as a greeting card and/or story cards that correspond to the event, and one or more auxiliary elements thematically associated with the scene to celebrate the event, such as a banner that includes a message board for conveying a message displayed on a front surface of the message board and that is configured to extend over the scene. A template is included that is a visual representation of a position of the one or more cards and the one or more auxiliary elements upon the mat and that includes indicia representing the components and indicating where to position the components upon the mat to assemble the kit to create the scene.

The embodiments described herein relate to a method of assembling a kit to create a scene to celebrate an event having a theme. The method includes providing the kit to celebrate the event. The kit is contained in a casing configured for shipping and handling. The kit comprises a main element, at least one auxiliary element, a mat, and a template that includes indicia associated with components of the kit, including the main element and the at least one auxiliary element, to indicate placement of the components thereon to create the scene. The method also includes removing the kit from a protective casing containing the kit, which includes removing the main element, the at least one auxiliary element, the mat, and the template from the casing. The method further includes positioning the mat in a desired location and orienting the components of the kit, including the main element and the at least one auxiliary element, on the mat according to the template. The at least one auxiliary element may include a banner having a message board that is configured to be supported above the scene. The method may further include providing at least one sheet of paper that includes at least one instruction for assembly or use of the at least one auxiliary element of the kit and assembling or using the at least one auxiliary element according to the at least one instruction.

The embodiments described herein relate to a method of providing a kit to celebrate an event. The method comprises assembling components of the kit, including obtaining the components of the kit, the components including a main element, a mat, and one or more auxiliary elements, and providing a template that includes indicia associated with the components to indicate placement of the components in a position on the mat. The method further comprises packaging the components of the kit and the template in a protective casing. The method may further comprise distributing the kit to a purchaser.

BRIEF DESCRIPTION OF THE DRAWING FIGURES

Embodiments of the invention are described in detail below with reference to the attached drawing figures, wherein:

FIG. 1 is a diagrammatic view of a scene formed from an embodiment of an assembled celebration kit that includes a scene mat, a greeting card, auxiliary elements, and a complimentary element, the auxiliary elements including a banner, two scene note cards, and decorative glasses, and the complimentary element including confetti;

FIG. 2 is a diagrammatic view of a scene formed from another embodiment of an assembled celebration kit that is primarily formed from paper products and that includes a scene mat, a greeting card, auxiliary elements, and complimentary elements, the auxiliary elements including a banner facing rearward to show column securement features and two scene note cards, and the complimentary elements including a game and decorative cutouts or confetti;

Figure 1:
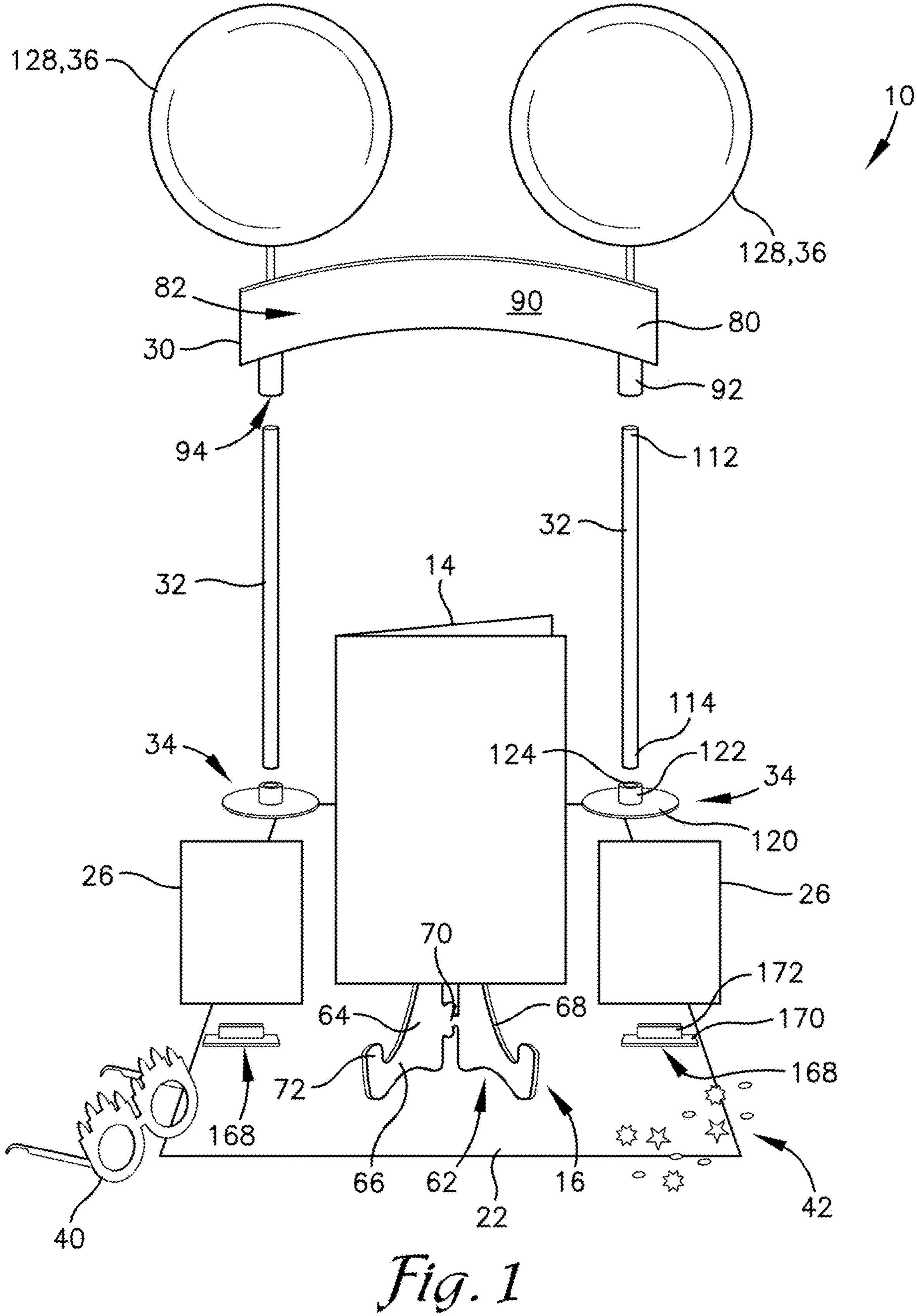

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Figure 2:
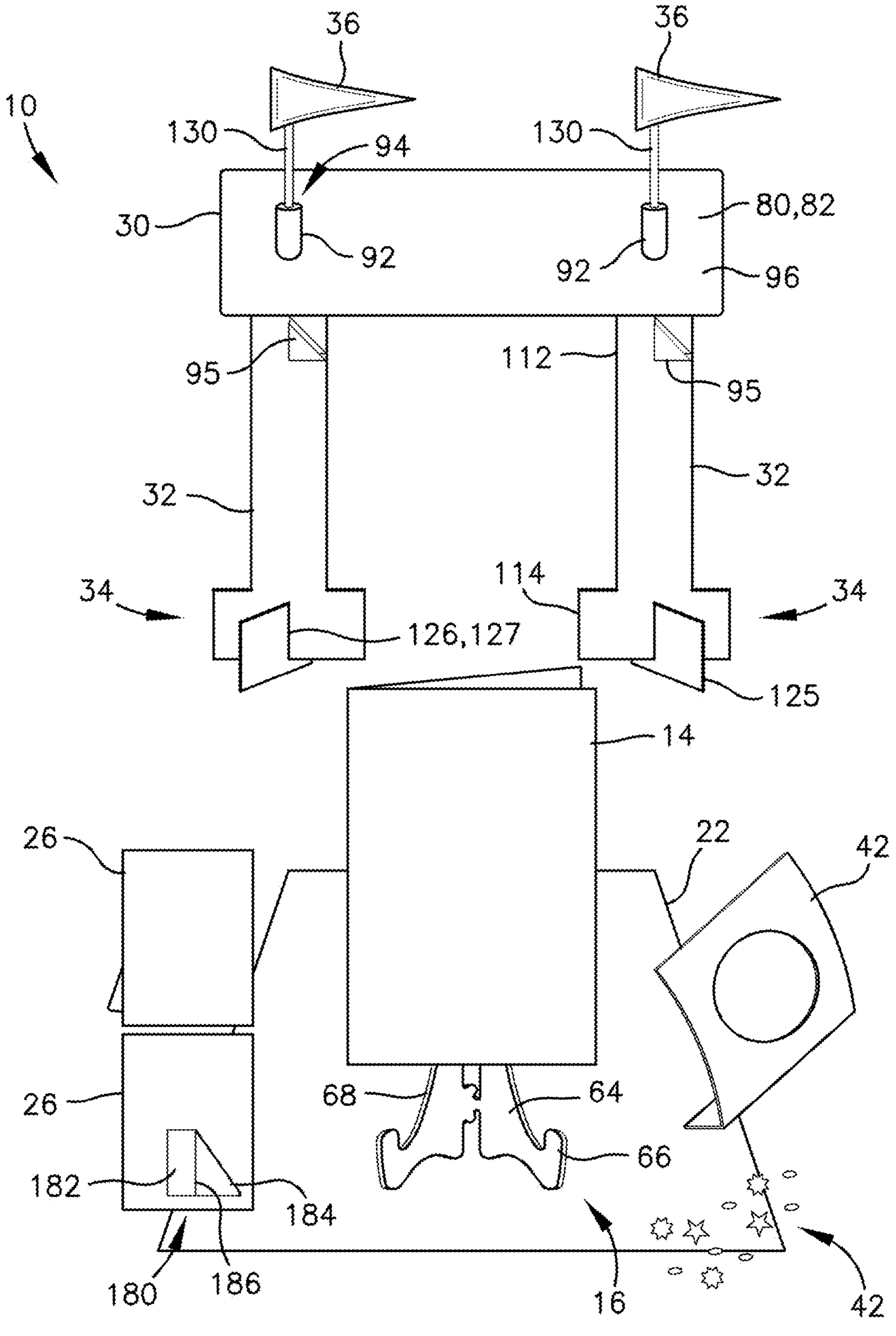
Figure 3:
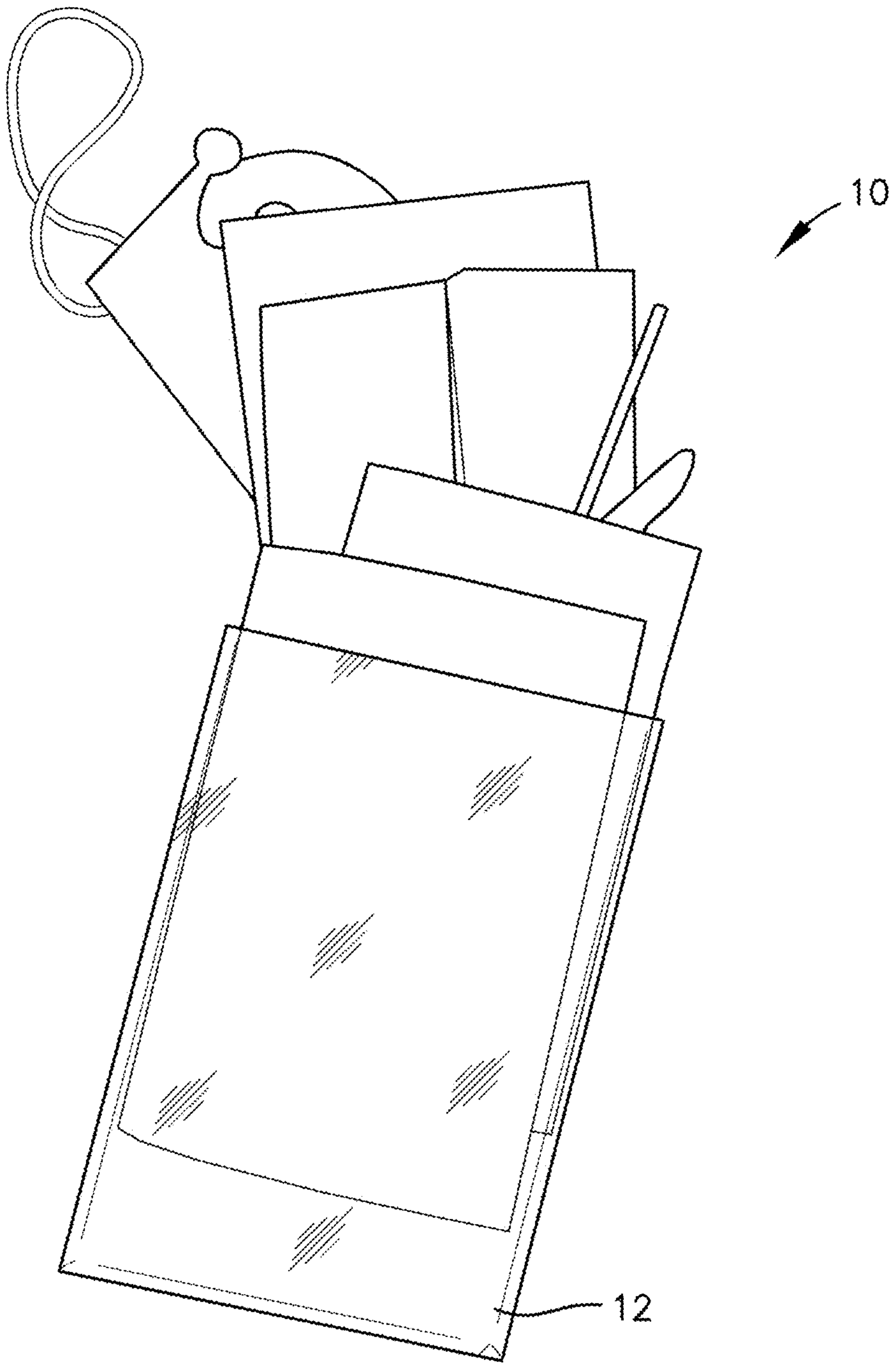
FIG. 3 is a front view of an embodiment of a clear envelope that is configured to contain the celebration kits of FIG. 1 or FIG. 2.
Figure 4:
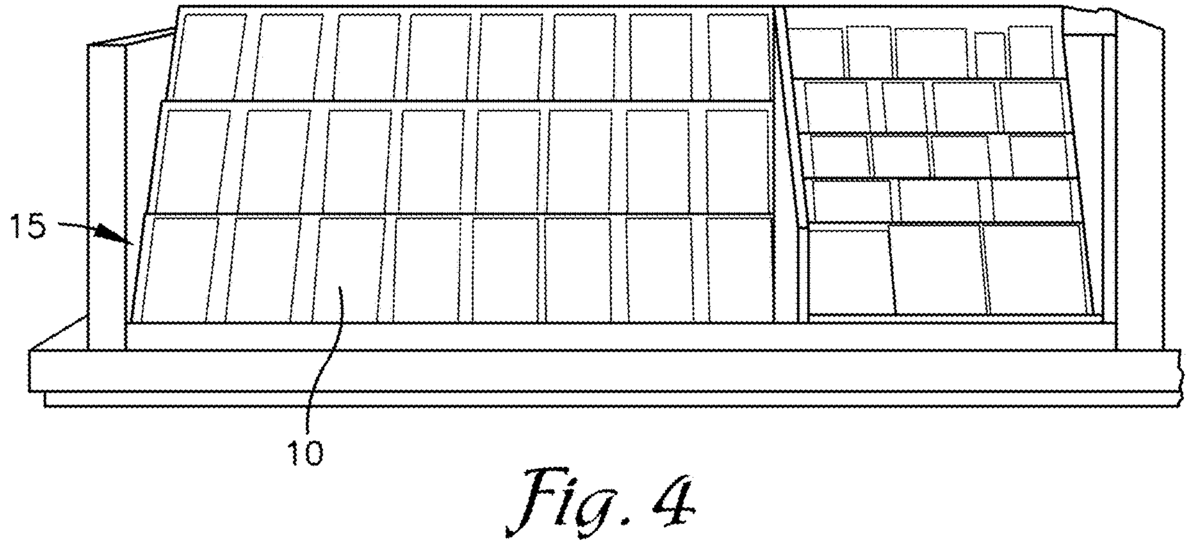
FIG. 4 shows a view of a kit display unit containing a plurality of celebration kits in protective casings, such as the celebration kits in FIGS. 1 and 2, in a retail setting.

Embodiments described herein relate to a kit 10, which may be referred to as a special occasion or celebration kit as shown in FIGS. 1 and 2 for creating a scene to celebrate an event. The kit 10 may also be referred to as a party pack, a greeting card kit, or a kit referring to the special occasion or event that includes a theme, such as a birthday kit. As shown in FIG. 3, the kit 10 is packaged in a protective casing or packaging 12, such as a flat pack envelope or box, having an image or design associated with the theme of the kit 10 viewable by a consumer, such as a view of a greeting card 14 or a view of the scene formed by the kit 10, through clear packaging or through a clear window in packaging for the kit 10. As shown in FIG. 4, the kit 10 may be displayed and offered for sale in a greeting card or party décor section of a retailer.

In an embodiment, the protective casing 12 containing the kit 10 is approximately six inches by nine inches by one inch and is configured to be positioned in a kit display case or unit, similar to a greeting card display unit or rack, such as the kit display unit 15 shown in FIG. 4. The size of the kit 10 is selected to facilitate shipping and handling, which may include sending the kit 10 to a customer or recipient such as by mailing of the kit, and handling of the kit 10 by a recipient. The protective casing 12 may be larger or smaller to accommodate the components or contents of the kit 10.

The assembled kits 10 may include a variety of embodiments. In the embodiments shown in FIGS. 1 and 2, each kit 10 includes a plurality of components thematically associated with the theme of the event. The plurality of components may include a main element, such as the greeting card 14 supported on a card support stand or a hinged easel 16, and one or more auxiliary elements for arrangement on a scene mat or underlay 22. For illustrative purposes, the auxiliary elements may not be shown on the scene mat 22 in the embodiments shown in the drawings. It is to be understood that a variety or a wide range of auxiliary elements for creating a celebratory scene may be included in the kits 10 of the present invention, including one or more scene or story note cards 26, a banner 30 supported on one or more columns 32 attached to or formed integral with supports or footers 34, one or more decorative elements 36 for coupling to the banner 30, one or more wearable party favors 40, and/or one or more other complimentary elements 42 following the theme of the kit 10 and suitable for celebrating or for decorating the scene, including confetti, glitter, noise makers, trinkets, games, ornaments, etc. The main element may include one or more of the greeting card 14, a small book, a photo frame, a decorative element, or another foreseeable element to express a sentiment of the occasion.

The celebratory scenes formed by the kits 10 may include a variety of themes for celebrations, such as, for example, birthdays, Mother's Day, Father's Day, Boss's Day, Administrative Assistant's Day, holidays, and other days or events similarly celebrated or that would be commemorated with a greeting card. Each type of celebration or event or theme may include a variety of designs to choose from. For example, kits 10 for celebrating birthdays may include designs for children, such as video games, baby animals, and popular characters, and designs for adults, such as traditional, humorous, and sentimental designs. The scene created by the kit 10 provides an opportunity to recognize a special occasion, creates a celebration in a small space, and provides a photo opportunity that can be shared with others, such as electronically, by text, email, or social media, or physically, by printing a hard copy of the photograph to share the celebration and memory.

Figure 5:
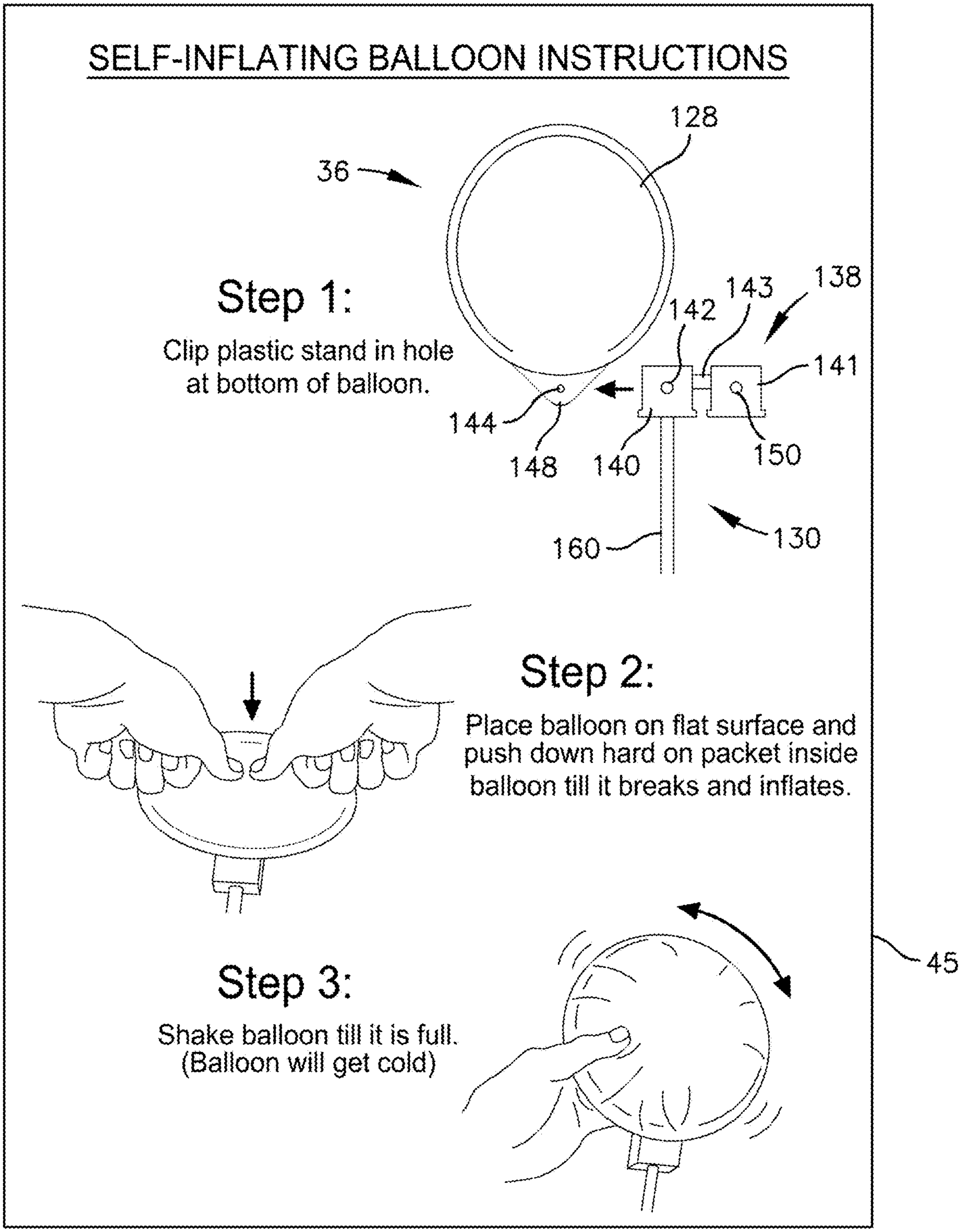
FIG. 5 is an embodiment of a diagram that includes instructions having one or more steps for assembly of an auxiliary element, and specifically includes instructions for assembling and inflating a self-inflating balloon that is included in an embodiment of the kit shown in FIG. 1.
Figure 6:
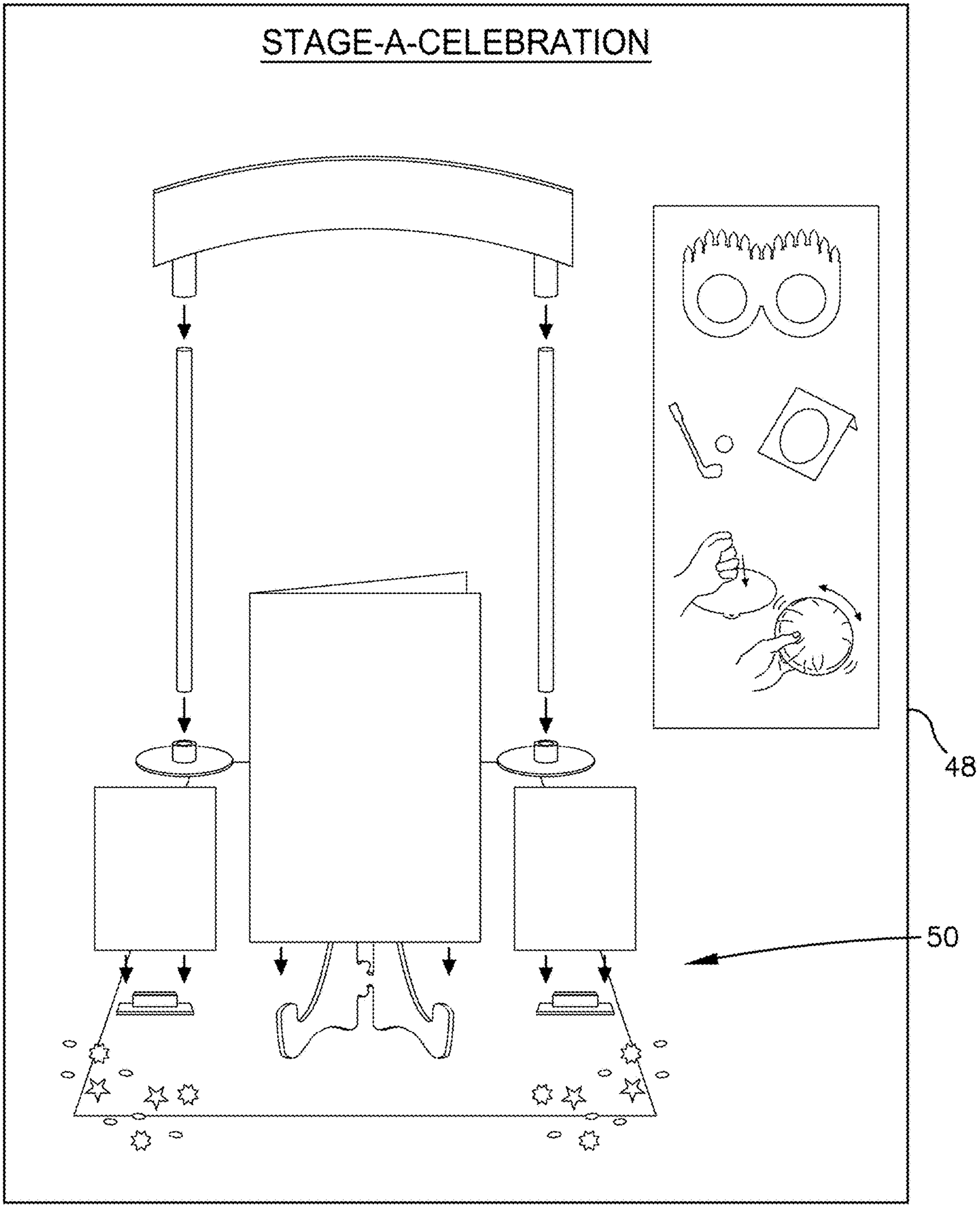
FIG. 6 is an embodiment of an instruction sheet having a template showing placement of components of a celebration kit on the scene mat to form the scene formed from an embodiment of a celebration kit, such as the embodiment of the celebration kit shown in FIG. 1.

The kit 10 includes one or more sheets of paper that include instructions for the kit 10, such as a diagram 45 that includes instructions for assembly or use of the components, including the main element and/or the auxiliary elements, as shown in FIG. 5, and/or an instruction sheet 48 having a template 50 showing placement of the components on the scene mat 22 to create the scene, as shown in FIG. 6. As shown in FIG. 5, the diagram 45 may include instructions for assembly of the decorative elements 36. The template 50 is a visual reference for an assembler or user and facilitates arrangement of the components to create the scene. In an embodiment, each of the components included in the kit is included in the template 50. In another embodiment, the components that are included in each of differently themed kits 10 and/or kits 10 with different designs are included on the template 50, such that the same template 50 can be used with a variety of different kits 10 having different themes and/or different designs. The template 50 on the instruction sheet 48 may be a scaled version of the scene and include indicia representing various components, including pictorial, numerical or other indicia, to indicate placement of the components on the scene mat 22.

The assembled kit 10 forms a miniaturized scene or celebration stage that can be set up on a table (not shown) and is sized to be contained in an individual's tabletop space, such as on a desktop of a single desk or in an individual's workspace on a shared desk. It is foreseeable that the kit 10 could be formed in different sizes and/or for multiple people, such as, for example, a kit sized to be contained on a gathering table for a plurality of people having a celebration.

The scene mat 22 is included in the kit 10 and is a layer of material, such as, for example, paper, plastic, rubber or cloth, that is intended to create a visually appealing background for the components of the kit 10. The scene mat 22 defines an area for the scene and is precut and may be printed or decorated with graphics that correspond to the event. In one embodiment, the scene mat 22 is approximately 8.5 inches by 11 inches in size and is foldable to be contained within the protective casing 12, such as an envelope sized to receive paper of 8.5 inches by 11 inches, but it is foreseeable that the scene mat 22 could be larger or smaller in size depending on the size and number of components and the size of the celebration scene and foldable to fit within the envelope 12. It is foreseeable that the scene mat 22 could include a template 50 printed thereon indicating placement of the components.

The main element, such as the greeting card 14 in the embodiments shown, forms one of the main visible components of the kit 10 and may be supported by the stand 16. The greeting card 14 includes an envelope (not shown) configured to contain the greeting card 14. In the embodiments, the hinged easel 16 is configured to support and display the greeting card 14 in an upright position. In the template 50, the greeting card 14 is centrally positioned. The greeting card 14 is formed from card stock or another high quality paper and may include a graphic design element, a message or sentiment, and a blank area to write a personal message. In an embodiment, the greeting card 14 is formed from a rectangular piece of paper and folded with the graphic on the front and the area to write a personal message on the inside. The greeting card 14 is formed to be contained in the protective casing 12.

In the embodiment shown, the hinged easel 16 that may include two L-shaped members 62 each having a long leg or card support member 64 coupled to an end of a short leg or retaining edge 66. The long legs 64 are essentially triangular-shaped and include a hinging side and a supporting side 68. The hinging side of the long legs of the L-shaped members 62 are connected to each other with one or more hinges 70 such that the members 62 are rotatable about a hinge axis extending through the one or more hinges 70. In an embodiment, an end of each of the short legs 66 opposite the long legs 64 includes an upward extending foot or barb 72 for supporting the greeting card 14, in cooperation with the supporting side 68 of the long leg 64 of the L-shaped member 62, in an upright position and preventing the greeting card 14 from sliding off the short legs 66 of the hinged easel 16. It is foreseeable that a depression or divot in the easel 16 could be configured to support the card. It is foreseeable that a different embodiment of the easel 16 or an alternate stand could be used to display the card or that the main element 14 could be displayed without the stand. In an embodiment shown in FIG. 2, the easel 16 is formed from a paper product, such as cardboard or cardstock, and foldable about a central fold.

The banner 30 is a miniaturized sign or flag that includes a message board or message panel 80 with a design or a message 82 intended to be conveyed. The message 82 is selected to be consistent with the theme or event, such as, for example, congratulations or happy birthday, and is displayed on a front surface 90 of the message board 80 over the scene. In the template 50, the banner 30 extends over the other components of the kit 10. The banner 30, at least visually and thematically, unites the components of the kit 10 and may support other components. The banner 30 is configured in assemblable parts such that the disassembled banner 30 may be contained within the protective casing 12. The banner 30 may be formed from a plastic, paper, or other foreseeable product.

In an embodiment, the banner 30 includes the message board 80 secured to or formed integrally with two first column securement features or sockets or tubes 92, each having a vertically and inwardly extending bore 94 formed therein, and configured to couple the banner 30 to the columns 32 and/or to one or more of the other auxiliary elements, such as the decorative elements 36. The columns 32 are each coupled to a footer 34 configured to support the banner 30 on a surface of the scene mat 22 in an upright position such that the message 82 of the banner 30 is displayed over the scene. It is foreseeable that the banner 30 could include one first column securement feature 92 and be supported by one column 32 coupled to one footer 34, such as, for example, a banner in the nature of a flag, or that the banner 30 could include more than two first column securement features 92 and be supported by a similar number of columns 32 coupled to footers 34. In an embodiment, the message board 80 may be coupled to each of the one or more columns 32 with a second column securement feature or an adhesive tab 95, as shown in FIG. 2.

Figure 7:
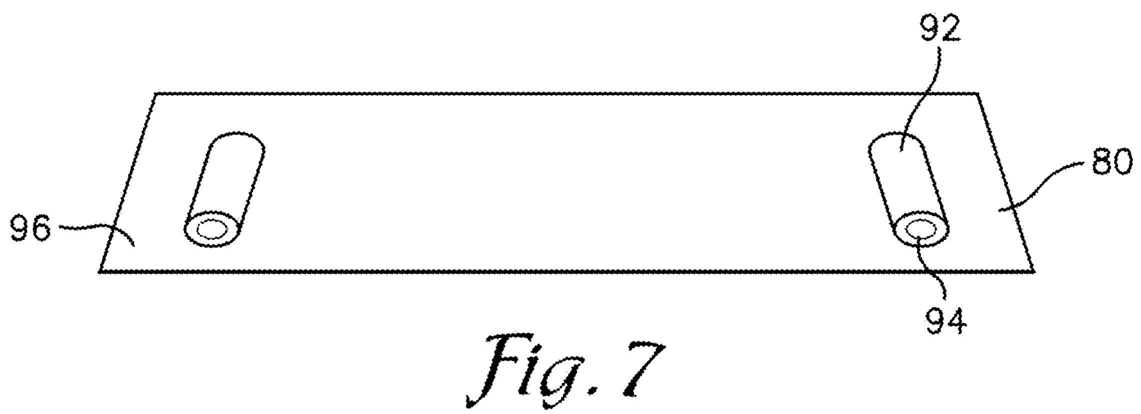
FIG. 7 shows a rear perspective view of an embodiment of a message board having first column securement features secured to a rear surface of the message board shown in FIG. 1.
Figure 8:
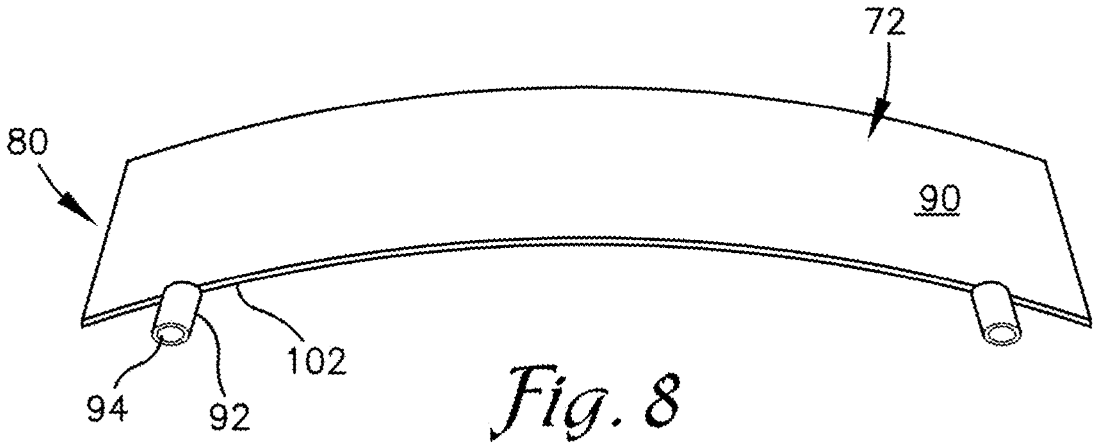
FIG. 8 shows a bottom perspective view of an alternate embodiment of a message board having first column securement features extending from a bottom surface of the message board.

In one embodiment, the banner 30 is a unitary member that includes the message board 80 and the first column securement features 92 that may be formed integrally therewith, with the message 82 printed, painted, colored or otherwise adhered to the front surface 90 of the message board 80. The two first column securement features 92 are positioned on opposite ends of the message board 80 and extend from a rear surface 96 of the message board 80, as shown in FIG. 7, or from a bottom surface 102 of the message board 80, as shown in FIG. 8. In another embodiment, the message board 80 is formed separate from the first column securement features 92 and the first column securement features 92 are secured to the rear surface 96 of the message board 80, such as with an adhesive. The banner 30 may be printed from plastic or formed or die cut from a rigid cardboard or cardstock that is configured to display the message 82 thereon or formed by other suitable material or processes.

As shown in FIG. 1, first ends 112 of the columns 32 may extend within the sockets 92 by insertion into the bore 94 formed in each socket 92 to secure the columns 32 to the banner 30. An internal diameter of each of the bores 94 slightly exceeds an external diameter of each first end 112 of the associated column 32 such that an interference fit is formed when each column 32 is pushed into the respective bore 94. In this embodiment, the column 32 is a straw formed from a rigid paper, such as a cardboard or cardstock material and/or plastic material. In an embodiment, the bores 94 extend vertically all the way through the first column securement features 92 and the columns 32 extend at least partially through the bores 94.

In an embodiment shown in FIG. 2, the columns 32 are formed from a flat, rigid material, that may be the plastic material or rigid cardboard or cardstock material, and the column securement feature is the adhesive tab 95 that is secured to either the rear surface 96 of the message board 80 or to the first end 112 of the columns 32 to secure the column 32 to the message board 80 of the banner 30. The adhesive tab 95 comprises a removable adhesive release liner that protects an adhesive until a user removes the adhesive release liner to secure the message board 80 to the columns 32 via pressure applied thereto.

As shown in FIG. 1, in an embodiment the column footers 34 are coupled to a second end 114 of each of the columns 32. In this embodiment, each footer 34 includes a base 120 connected to a column support securement feature or socket 122 having a bore 124 for securing the column 32 thereto. The footer 34 is a unitary member that includes the base 120 and the socket 122 that may be formed integrally therewith from a plastic or rigid paper material and are configured to support the columns 32 and the message board 80 thereabove and over the scene mat 22. An internal diameter of the bore 124 of each socket 122 slightly exceeds an external diameter of each second end 114 of the respective column 32 inserted thereinto and an interference fit is formed when the column 32 is pushed into the socket 122.

In an embodiment shown in FIG. 2, each of the columns 32 includes a footer 34 formed from the second end 114 of each column 32 and a support brace or base 125 to which the column 32 is securable. The second end 114 of the column 32 includes a slot 126, and the column 32 is insertable into a slot 127 of the base 125 such that the footer 34 is formed to support the column 32 with the banner 30 coupled thereabove. The second end 114 of the column 32 may be a widened portion of the column 32 that is configured to form the footer 34 to support the banner 30 thereabove. It is foreseeable that each footer 34 and associated column 32 may be integrally formed.

The decorative elements 36 that may be coupled to the banner 30 include, for example, one or more balloons, flags, and other baubles or party décor. The decorative elements 36 enhance the celebratory scene formed by the kit 10. FIG. 5 shows an embodiment of a diagram 45 that may be included with the kit 10 for assembly of one embodiment of the decorative elements 36 that includes a self-inflating miniature balloon 128. In this embodiment, the diagram 45 includes a series of steps with instructions and drawings for assembly of the self-inflating miniature balloon 128 that includes inflating and coupling the balloon 128 to a stand 130 that is couplable to the first column securement feature 92 by insertion into a top of the bore 94 extending therethrough. The stand 130 includes a coupler 138 configured to be secured to the balloon 128. The coupler 138 includes a first and second fastener portions 140 and 141 hingedly secured together by a living hinge 143. A finger or prong 142, secured to and projecting from the first fastener portion 140, is selectively insertable into a hole 144 in a non-inflatable portion or securement tab 148 of the balloon 128. A mating receiver 150 is formed in the second fastener portion 141. The first fastener portion 140 and the second fastener portion 141 are hingedly closed and fastened together over the tab 148 of the balloon 128 which is secured therebetween with the finger 142 of first fastener portion 140 extending through the hole 144 in balloon securement tab 148 and into the mating receiver or recess 150 formed in the second fastener portion 141. In the diagram 45, step 1 includes instructions and a drawing directed to a user to clip the stand 130 to the hole 144 of the securement tab 148 at a bottom of the balloon 128, as detailed herein. After the coupler 138 is fastened to the balloon 128, the balloon 128 is inflated. In one embodiment, a means for inflating the balloon includes a packet containing citric acid located within the balloon. When the packet is broken, the citric acid and sodium bicarbonate within the balloon form an endothermic chemical reaction that produces carbon dioxide that causes the balloon to inflate. In the diagram 45, step 2 includes instructions and a drawing directed to a user to place the balloon 128 on a flat surface and push down on the packet inside the balloon 128 to break the packet therein to causes the balloon 128 to inflate. Step 3 includes instructions and a drawing that is directed to a user to shake the balloon 128 until the balloon is fully inflated.

As shown in FIG. 1, the balloon 128 may be part of the scene that supports the celebration and is configured to be coupled to the banner 30 The stand 130 secured to the balloon 128 includes a post 160 that is insertable into a top of the bore 94 of the first column securement feature 92 shown in FIG. 7. Similar to column 32, the inner diameter of the bore 94 may slightly exceed the outer diameter of the post 160 such that an interference fit is formed, securing the balloon 128 coupled to the stand 130 to the first column securement feature 92. The post 160 of the stand 130 may rest upon the first end 112 of the column 32 in the bore 94. It is foreseeable that a variety of different decorative elements 36 can be secured to the first column securement feature 92, including, for example, figurines, baubles, additional signs or banners, flags and ribbons. It is also foreseeable that the decorative elements 36 may have included therewith a separate stand or support 130 for supporting and securing each decorative element 36 on the scene mat 22 to create the scene. In the embodiment shown in FIG. 1, each first column securement feature 92 includes one balloon coupled thereto. In the embodiment shown in FIG. 2, the decorative elements 36 are secured to the first column securement feature 92, and the columns 32 are secured to the banner 30 via the second column securement feature or adhesive tab 95.

Figure 9:
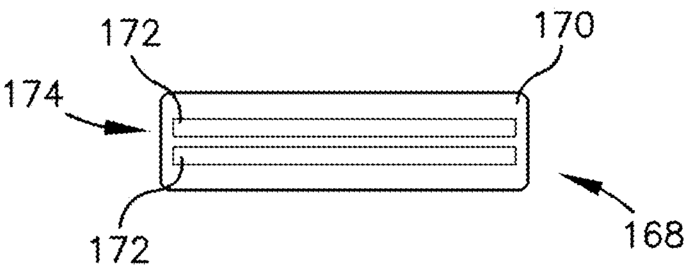
FIG. 9 shows a top plan view of a stand having two flanges extending from a base that are configured to support one of the scene note cards shown in FIG. 1.

The one or more scene or story note cards 26 include messages or graphics thereon that are associated with the theme of the celebration or scene. In one embodiment, the cards 26 form a visual story or narrative that is aligned with the theme of the kit 10 and the main element, such as the associated greeting card 14. In the embodiment shown in FIG. 1, the cards 26 are smaller in size than the greeting card 14. The cards 26 are formed from a card stock or rigid paper. The cards 26 may be supported on a stand-up base or display stand 168 that includes a rectangular base portion 170 having two flanges 172 with a groove 174 extending therebetween, as shown in FIGS. 1 and 9. The card 26 is inserted into the groove 174 and supported by the two flanges 172 to display the message or graphic on a front surface of the card 26. In another embodiment, the card 26 may be folded in half and supported on a surface or on the scene mat 22 on the two edges of the card 26 opposite the fold or on two edges of the card 26 adjacent the fold, such that the message or graphic on the card 26 is displayed. In yet another embodiment shown in FIG. 2, a card support 180 may be secured to a back of the card 26 to support the card 26 in an upright position. The card support 180 is formed such that a first portion 182 of the card support 180 is secured to the card 26 and a second portion 184 extends from the first portion 182 to provide support for the card 26. In an embodiment, the card support 180 may be formed from a cardboard or cardstock material and/or plastic material, and the first portion 182 may be integral with the second portion 184 with a fold 186 extending therebetween.

The wearable party favor 40 includes one or more of a variety of party favors that a user or users can wear, including, for example eyewear, headwear, and/or necklaces or neckwear. The wearable party favor 40 is associated with the theme of the celebration or scene or event. In an embodiment, the wearable party favor 40 is preferably an embodiment that can be folded flat to be contained in the protective casing 12, such as, for example, foldable paper eyewear, such as costume glasses and eyepatches, flat crowns, masks, headbands, or other headwear that may include a paper or plastic front portion with a cord or elastic band fastened to the front portion for securing to a user's head, and flat formed paper or plastic medals or charms attached to a ribbon or streamer. The wearable party favor 40 is preferably adorned or embellished or decorated to support the theme or event of the kit 10. FIG. 1 includes a pair of paper glasses that are foldable and shaped and/or embellished to support the theme or event.

The complimentary elements 42 may include any number of paper or plastic enhancements to support the theme or event of the celebration and scene, including a game, such as an interactive activity or a pre-printed challenge on paper, a small toy for entertainment, such as a handheld game or token, or other party embellishments, such as decorations, cutouts, glitter or confetti. In FIG. 1, the complimentary element 42 shown includes shaped confetti or decorative cutouts, and in FIG. 2 the complimentary elements 42 shown include a game board having an opening to play a toss game and the decorative cutouts.

A method of providing the kit 10 to create a scene to celebrate an event is disclosed herein. The method includes producing or otherwise obtaining the components of the kit 10. The components may be associated with an event and/or a theme of the celebration to create the scene. The components of the kit 10 include at least the main element, such as the greeting card 14, the scene mat 22, and one or more auxiliary elements that may include the banner 30 and decorative elements 36 that are configured to be supported above the scene, a scene card 26 to support the event and/or theme of the scene, a wearable party favor 40, and a complimentary element 42. The template 50 is provided with the kit 10 for instructing a user where to place the components on the scene mat 22 to create the scene for celebration. In one embodiment, the diagram 45 may be provided that includes instructions for an end user or recipient for assembly or use of the components in the kit 10. A protective casing 12 is provided for containing the celebratory kit 10 and is selected to facilitate mailing of the kit and handling by a recipient. The components of the kit 10 are selected and packaged in the protective casing 12 and then shipped or otherwise delivered to a customer, which may include one or more of a distributor, retailer, final customer or purchaser, and recipient. A plurality of a variety of kits 10 may be displayed in the in-store display 15 for purchase.

A method of assembly of the celebration kit 10 is disclosed herein. A user first removes the kit 10 from the protective casing 12, which may include the diagram 45 and/or the instruction sheet 48 that includes the template 50. The diagram 45 provides instructions that instruct the purchaser or a user on assembly or use of one or more of the components of the kit 10. The template 50 directs a user to arrange the components of the kit 10 to create the scene for celebration, including unfolding the scene mat 22 and positioning the scene mat 22 on a flat surface in a desired location, assembling the components, such as the banner 30, easel or stand 16, note cards 26 on display stands 168, and other main, auxiliary or decorative elements, and orienting the components on the scene mat 22 according to the visual representation of the template 50. The greeting card 14 and/or the cards 26 may be signed or a personal message inscribed therein prior to placement in the scene.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the claims.

What is claimed is:

1. A kit assemblable for creating a scene to celebrate an event, the kit comprising:

a mat that defines an area of the scene, the mat configured to support components thereon;

a main element thematically associated with the event;

an auxiliary element thematically associated with the event; and a template that is a visual representation of a position of the main element and the auxiliary element upon the mat.

2. The kit of claim 1, wherein the auxiliary element comprises a banner that includes a message board for conveying a message displayed on a front surface thereof and that is configured to extend over the scene.

3. The kit of claim 2, wherein the message board is coupled to a column securement feature, and a column secured to the column securement feature of the banner supports the banner over the scene.

4. The kit of claim 3, further comprising a decorative element coupled to the banner.

5. The kit of claim 4, wherein the decorative element is secured to the column securement feature.

6. The kit of claim 1, further comprising a wearable party favor thematically associated with the event.

7. The kit of claim 1, further comprising one or more scene cards that are configured to be supported on the mat.

8. The kit of claim 1, wherein the kit, after assembling according to the template, is configured to be contained in an individual's tabletop space.

9. The kit of claim 1, wherein the kit is configured to be contained in a flat casing prior to assembly.

10. A kit assemblable for creating a scene to celebrate an event, the kit comprising:

a mat that defines an area of the scene and is configured to support one or more cards and one or more auxiliary elements thereon;

the one or more cards thematically associated with the event;

the one or more auxiliary elements thematically associated with the event;

a template that is a visual representation of a position of the one or more cards and the one or more auxiliary elements on the mat; wherein:

the kit is packaged in a casing configured for shipping and handling, and the scene created by the kit is a miniaturized scene configured to be supported on a surface.

11. The kit of claim 10, wherein the one or more auxiliary elements comprise a banner configured to extend over the scene that includes a message board for conveying a message and a column for supporting the message board, wherein the column is secured to the message board by a column securement feature.

12. The kit of claim 10, wherein the one or more auxiliary elements comprise one or more decorative elements.

13. The kit of claim 12, wherein the one or more decorative elements are coupled to a column securement feature.

14. The kit of claim 10, wherein the one or more auxiliary elements comprise a wearable party favor thematically associated with the event.

15. A method of assembling a kit for creating a scene to celebrate an event, the method comprising:

providing the kit to celebrate the event, wherein the kit is contained in a casing configured for shipping and handling, and the kit comprises a main element, at least one auxiliary element, a mat, and a template that includes indicia associated with the main element and the at least one auxiliary element to indicate placement of the main element and the at least one auxiliary element on the mat to create the scene;

removing the main element, the at least one auxiliary element, the mat, and the template from the casing containing the kit;

positioning the mat in a desired location; and orienting the main element and the at least one auxiliary element on the mat according to the template.

16. The method of claim 15, further comprising providing at least one sheet of paper that includes at least one instruction for assembly or use of the at least one auxiliary element of the kit, and assembling or using the at least one auxiliary element.

17. A method of providing a kit to celebrate an event, comprising:

assembling components of the kit, including:

obtaining the components of the kit, the components including a main element, a mat, and one or more auxiliary elements, and providing a template configured to indicate a position of the one or more auxiliary elements and the main element on the mat; and packaging the components of the kit and the template in a protective casing.

18. The method of claim 17, wherein the components of the kit are configured to create a miniaturized scene thematically associated with the event, and the miniaturized scene is configured to be contained on an individual's tabletop space.

19. The method of claim 17, further comprising providing at least one sheet of paper that includes at least one instruction for assembly or use of the one or more auxiliary elements.

20. The method of claim 17, wherein the protective casing is selected to facilitate shipping and handling of the kit.

* * * * *